Jan. 19, 1971 W. K. BANKS ET AL 3,556,638
DEFLECTOR PLATE FOR LIGHT DEFLECTOR
Filed June 5, 1968 2 Sheets-Sheet 1

*INVENTORS*
WILLARD K. BANKS
MELBOURNE E. RABEDEAU

BY Gerald S. Moore

ATTORNEY

United States Patent Office 3,556,638
Patented Jan. 19, 1971

3,556,638
DEFLECTOR PLATE FOR LIGHT DEFLECTOR
Willard K. Banks, San Jose, and Melbourne E. Rabedeau, Saratoga, Calif., assignors to International Business Machines Corporation, Armonk, N.Y., a corporation of New York
Filed June 5, 1968, Ser. No. 734,718
Int. Cl. G02f 1/34
U.S. Cl. 350—161                       13 Claims

ABSTRACT OF THE DISCLOSURE

A light deflector comprising two light transparent members having adjacent surfaces wherein the second member is movable into and out of optical contact with the first. Light being passed through the first member is intercepted by that member's surface to be reflected by the principle of total internal reflection when the second member is not in contact with the first. With the surfaces in contact, the light will pass on ino the second member and be reflected along a separate path from the first path. This invention deals with means for controlling the position of the second member for regulating the path of the beam.

CROSS-REFERENCES TO RELATED APPLICATIONS

This invention relates to a deflector plate configuration for use in the deflector such as that of U.S. application Ser. No. 680,805, new Pat. No. 3,514,183 entitled Light Deflector System, filed on Nov. 6, 1967, with M. E. Rabedeau as inventor and assigned to the assignee of this application.

BACKGROUND OF THE INVENTION

Field of the invention

This invention relates to light deflectors in general, and, more specifically, to a deflector plate assembly for use with light deflectors such as those utilizing the total internal reflection principle.

Description of the prior art

The increased use of light as a transmitting medium has made light deflectors more and more important with the greater need for controlling and positioning the light beams. Many of the light deflectors employ the principle of total internal reflection in regulating the beam path. One main reason for the use of this phenomena is to position the beam with a minimum loss of light since the reflection coefficient of a total internal reflecting surface is very high in comparison to other usable means for reflecting light beams.

Along with the high light transmitting qualtities, an additional requirement of a good deflector is speed of response and useful life expectancy. In light deflectors such as that disclosed in the aforemention patent application the speed of response depends primarily upon the speed of actuation of the deflector plate. The general approach for actuating such plates has been to utilize piezoelectric elements or some electromagnetic mechanism, as is shown for instance in U.S. Pat. 2,565,514, Pajes, entitled Radiation Intensity Modulator issued on Aug. 28, 1951, and in U.S. Pat. 2,997,922, entitled Light Valve, which issued Aug. 29, 1961 with Edward K. Kaprelian as inventor.

One problem encountered in using prior actuating means is that on each actuation a certain amount of energy is dissipated in the actuator with the energy level increasing as the repetition rate is increased. Another difficulty arising is the time differential between the supplying of an actuating signal to the actuator mechanism and the actual movement of the plate so the beam, in fact, is deflected along a new path. Requirements of present day systems demand a fast-acting, reliable deflector with a long life and a high repetition rate.

While the deflector plate assembly described herein has a particular application in a total reflection light deflector such as that heretofore discussed, it is the general object of this invention to move an optical member within finite limits with a long life system which reacts quickly and accurately to a low power input signal regardless of the application of the member.

SUMMARY OF THE INVENTION

A deflector plate assembly for a light deflector of the total internal reflection type comprising a plate of transparent material with a piezoelectric element affixed thereto on the side opposite the main transparent member. In selected embodiments, the deflector plate is grooved to provide a lever action for movement of a segment of the plate away from the first transparent member. In specfic embodiments, the plate includes an annular depression in the surface contacting the first member with the area encompassed therein being partially evacuated to allow the second member to be returned into contact with the first member more readily.

The foregoing and other features and advantages of the invention will be apparent from the following more particular description of the preferred embodiments of the invention, as illustrated in the accompanying drawings.

DESCRIPTION OF PREFERRED EMBODIMENTS OF THE INVENTION

The invention is best understood with a clear understanding of the principle of total internal reflection employed by deflectors of one type in which the invention can be applied. This principle is well known in optics wherein almost total reflection of a light beam occurs when the beam being transmitted within a material having a higher index of refraction is intercepted by an external surface which is adjacent a material having a lower index of refraction. So long as the angle of incidence of the light rays approaching the surface exceeds the critical angle, total reflection at the surface will be achieved. For instance, with an ordinary right angle prism surrounded by air, light entering substantially perpendicular to one of the two right angle faces is totally reflected when it reaches the surface of the hypotenuse face. It is also known that this principle applies provided there is a film of air or a vacuum adjacent to the hypotenuse surface of approximately two wavelengths thick regardless of what material is located beyond the film. However, when a glass plate is brought into abutting relationship with the hypotenuse surface (thereby substituting the glass for the air as the adjacent medium), the light approaching the hypotenuse surface from the internal side of the prism will pass on into the glass plate.

Figure 1:
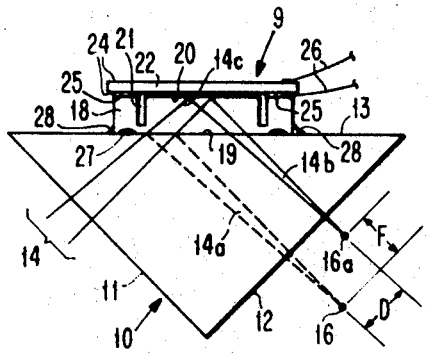
FIGS. 1 and 2 show a light deflector of a type in which the subject invention can be employed.
Figure 2:
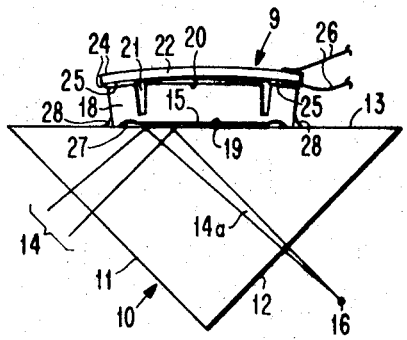

In FIG. 1 is shown a light deflector 9 representing one type of optical device in which the subject invention can be employed to great advantage. This deflector utilizes the total internal reflection principle wherein a first light transparent member shown here as a right angle prism 10 having right angle surfaces 11 and 12 and a hypotenuse surface 13 is positioned to receive a light beam 14 through the face 11. As shown in FIG. 2 and described in the prior art, the light beam approaching the surface at an angle exceeding the critical angle will be reflected off the hypotenuse surface if air or some other material having an index of refraction substantially lower than that of the prism is present in the space 15 external to the hypotenuse surface where the beam strikes. In the example to be described, the prism is surrounded by air or vacuum. However, it should be realized that other materials of different refractive indices could be used. Thus, the beam will be reflected totally along a first path 14a (FIGS. 1 and 2) through the prism to result in the beam being focused at a focal point 16. The reflection of the beam is due to the principle of total internal reflection just described, which principle occurs because the angle at which the light strikes the surface exceeds the critical angle for the prism material. While it is realized there is some slight loss in beam intensity due to the fact that a very small portion of the light will not be reflected by the surface 13, for purposes of the invention, the light is assumed to be totally reflected.

Positioned external to the hypotenuse surface 13 of the prism is a second light transparent member in the form of a reflection frustrating plate 18 contacting the hypotenuse surface at the point of intersection with the light beam 14. With the surface 19 of the glass plate 18 in abutting relationship with the hypotenuse surface of the prism, the index of refraction external to the hypotenuse surface is not substantially lower than the index of refraction of the prism and the total internal reflection is frustated. Thus, the beam passes external to the right angle prism along the path 14c shown in FIG. 1.

While the beam can be allowed to continue on out of the plate 18, if desired, the invention to be described is applied to a light deflector provided with a reflective surface 20 of the reflection frustrating plate 18 so that the beam 14, in reaching this surface, is reflected back along the path 14b. As indicated in FIG. 1, this reflection of the beam makes it possible to digitally offset the path of the beam a distance D by the actuation of the plate 18. The reflecting surface 20 can be formed by coating the surface with a reflective coating. However, the preferable embodiment utilizes the principle of total internal reflection of light by the proper alignment of the surface 20 relative to the beam at the point of intersection such that the beam is reflected along the path 14b.

In FIG. 1, it can be seen that the beam is reflected back along the path 14b, and, because of the similar indices of refraction of the plate 18 and the right angle prism 10, the light will again pass through the prism and out of the surface 12 (since the angle of the beam is less than the critical angle) to be focused in this instance at a point 16a external to the prism. Thus, the position of the beam is shown as being offset from the original path 14a by a distance D, which distance is a function of the length of the light beam path as the beam passes between the prism hypotenuse surface 13 and reflecting surface 20 of the glass plate 18. By varying the thickness of the glass plate 18, the distance D can be changed.

From the foregoing, it is apparent that by movement of that portion of the glass plate 18 adjacent the point of intersection of the light beam 14 with the hypotenuse surface 13 in a direction away from the hypotenuse surface by a distance approximating two wavelengths or more, the beam will be reflected along the path 14a. Actuation of the glass plate 18 until it contacts the hypotenuse surface 13 at the point of intersection with the beam 14 will cause the beam to pass on into the glass plate 14 and thereafter be reflected along the path 14b by the reflecting surface 20, as shown in the drawings. Of course, it is understood that actuation of the plate by lesser distances than two wavelengths from the prism will effect partial transmission of the beam away from the prism. This type of light modulator is not shown but is fully within the scope of application of this invention. A more detailed description of the invention can be obtained from the copending U.S. patent application Ser. No. 680,805 referenced heretofore.

Figure 3:
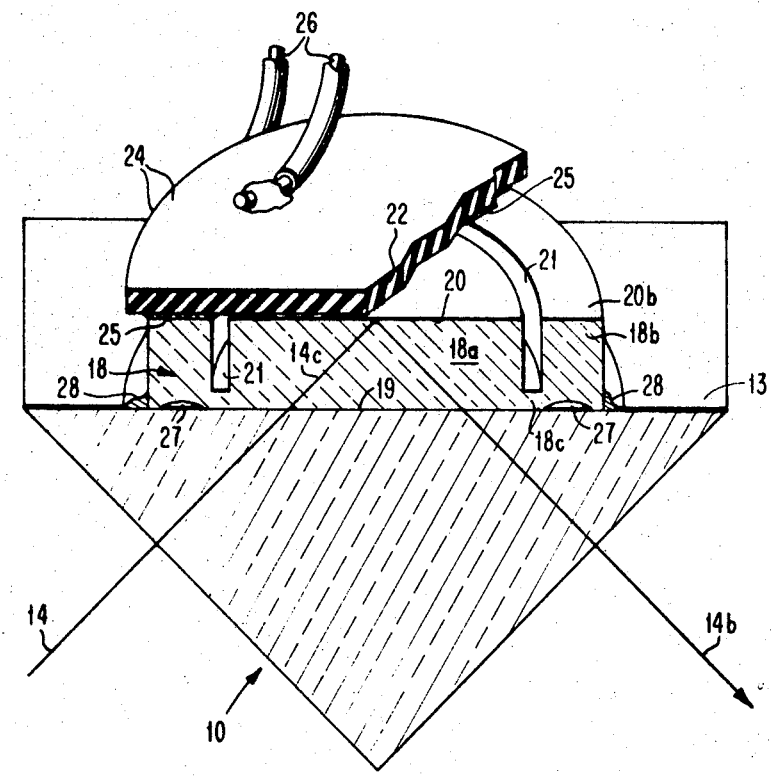
FIGS. 3 and 4 show a preferred embodiment of the deflector plate assembly in enlarged detail.

In accordance with one feature of the present invention, the deflecting plate shown in FIG. 3 includes means for making it flexible for movement of a portion thereof away from the prism, with the means taking the embodiment of a groove 21 forming an interspace in the surface 20 and extending around a center section 18a, to form therearound an annular shaped outer member 18b. An actuating assembly shown here as a piezoelectric element 22 affixed to the outer member moves the plate section into and out of abutting relationship with the surface 13. By this arrangement a leverage is applied which reduces the actuator force needed to drive the plate between its two operating positions. Additionally by the proper sizing of the plate portions, the movement of the actuating assembly can be amplifiied to move the center section greater or lesser distances than the actuator moves if desirable.

In the embodiment shown, the deflecting plate 18 has a circular disc configuration with the groove 21 separating the circular inner section 18a and the annular outer member 18b. At the bottom of the groove joining the center section and annular member is a bending area 18c forming a hinge extending adjacent the surface 19. The piezoelectric element is cemented at the surface 20b of the annular member at points radially spaced from the inner section and located around the top of the annular member. Attached to the electrodes 24 of the element are conductors 26 (which preferably are soldered in place by a low temperature solder) through which is supplied the actuating voltage for the deflecting plate assembly.

When the deflecting plate is in the position shown in FIG. 3, the light beam 14 passes from the transparent member 10 into the deflecting plate and is reflected by the principle of total internal reflection from the plate surface 20. Note that the inner surface of the piezoelectric element is spaced in the vertical direction from the surface 20 by the thickness of the cement layer 25. By spacing the element in this manner, the internal reflection of the beam by the surface 20 is not disturbed as it might be if the element actually contacted the deflecting plate.

Figure 4:
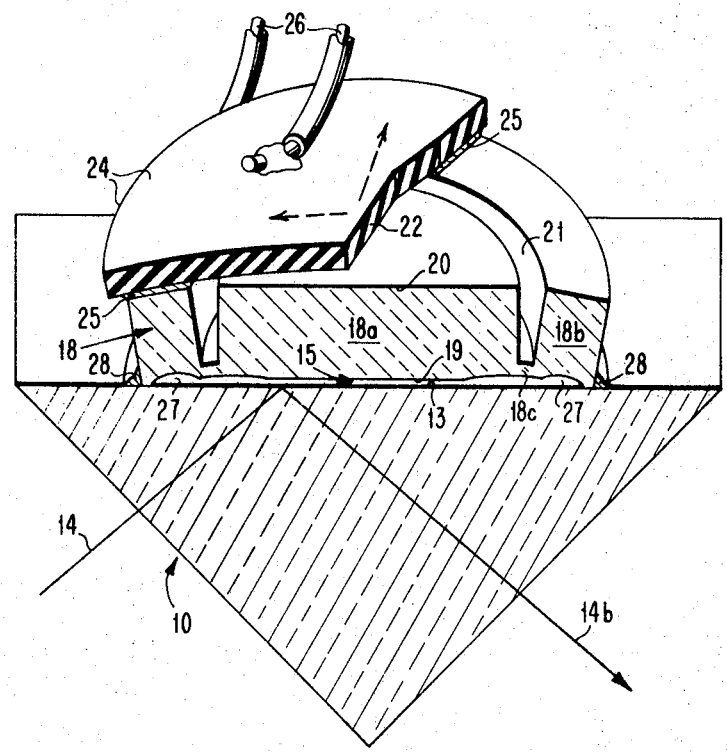

As shown in FIG. 4, an actuating voltage is applied between the conductors 26 causing the element 22 to expand radially in the normal manner. The plate member 18b limits such expansion thereby causing the element to assume the domed configuration shown in FIG. 4. Thus, the top side of the member 18b of the deflecting plate adjacent the surface 20b is moved radially outward away from the center section 18a while the bending portion 18c acts against such movement of the bottom side. As a result the annular member is caused to rotate up away from the surface 13 of the member 10. This rotation lifts the center section 18a away from the surface 13 of the prism 10 for actuation of the surface 19 of the deflecting plate to the second position spaced from the prism. The surfaces 13 and 19 preferably are moved apart approximately two wavelengths to interrupt completely the transmission of the light beam 14 into the deflecting plate and cause it to be reflected from the surface 13 along the path 14a. Upon changing the voltage across the element 22, the deflecting plate assumes its planar configuration allowing the beam to traverse the path 14b. If desirable, a reverse bias voltage can be applied through the conductors 26 to drive the piezoelectric element to the contracted condition for actuation of the deflecting plate to the planar configuration shown in FIG. 3. In either instance, molecular attraction between the plate and prism tends to hold the surfaces 13 and 19 together once the plate is moved to the position abutting the prism. Thus it can be seen that since a part of the deflecting plate remains in contact with the prism surface at all times, the attachment, actuation and positioning of the plate is made easier than if the complete deflecting plate was shifted away from the prism.

In accordance with a second feature of the present invention an annular depression 27 is formed in the surface 19 of the deflecting plate to ease movement of the plate away from the prism. Preferably, this annular depression extends around the surface 19 to form a small void between the prism 10 and the plate 18 when the adjacent surfaces are in abutting relationship. This depression need be only ¼ micron or more deep since its primary function is to reduce the force and area of contact between the transparent members. Since the members are drawn together by a molecular force due to their intimate contact at the surfaces 13 and 19, this depression, during actuation of the glass plate to the spaced position, permits the abutting surfaces to be separated more easily. There actually results a peeling action during separation of the members which requires the overcoming of a small attractive force at any one instance during separation.

It has been proven that the use of the groove and depression together greatly reduce the force required to separate the transparent members 10 and 18. For example, in order to lift a deflecting plate 17 millimeters in diameter and about 3 millimeters thick without a groove and a depression, a driving voltage of approximately 1500 volts has been found necessary to actuate a .050 inch thick lead titanate-zirconate piezoelectric driver. The same plate can be lifted with about one-eighth the energy by applying 300 volts across a .015 inch thick piezoelectric driver of the same composition, if the groove and depression are utilized. Furthermore, the center section 18a remains planar in configuration and thus parallel to the prism surface 13 thereby enlarging greatly the area of the adjacent surfaces which are usable for beam deflection.

To further ease the movement of the deflecting plate, the void between the plate and prism is partially evacuated. The lower pressure is advantageous since any air or other gas between the members will slow movement of the deflecting plate back into contact with the prism when the voltage across the element is relaxed. To maintain evacuation of this area, a bead 28 of cement is placed around the outer edge of the deflecting plate holding the plate and prism together. This bead serves both to seal the area between the transparent members and to hold the deflecting plate in position on the prism. The cement must be one which does not outgas much since the space between the members is at least partially evacuated. Thus not only is the deflecting plate permitted movement back into engagement with the prism more easily but if the surrounding environment is at a higher pressure, there results an atmospheric force applied to the surface 20 tending to move the plate towards the prism. This force adds to the normal forces heretofore described tending to restore the deflecting plate to its stable configuration. Additionally, the cement seals the area 15 from the outside atmosphere thereby preventing the entrance of dirt particles which contaminate the reflecting surfaces.

Figure 5:
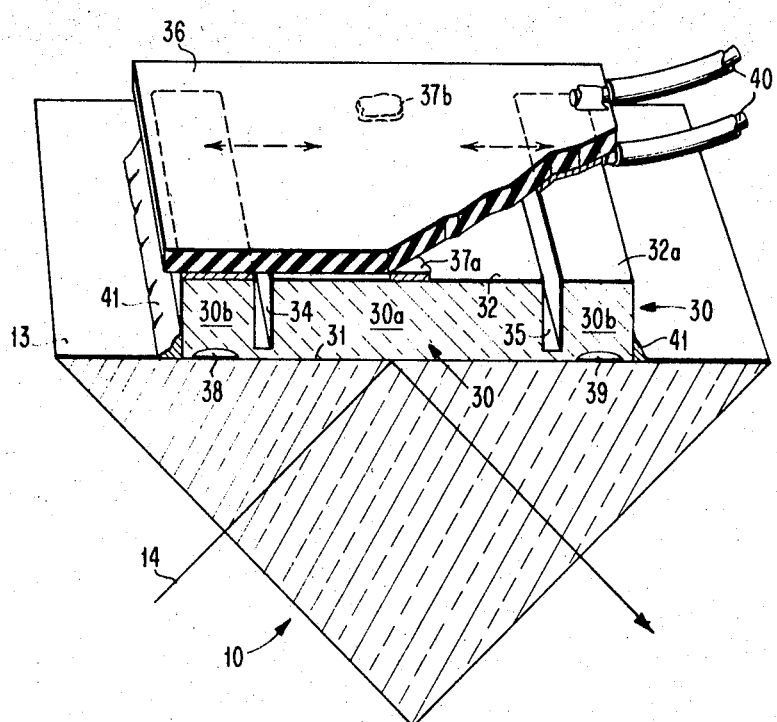
FIG. 5 shows a second embodiment of a deflector plate assembly.

In FIG. 5 is shown a second embodiment of a plate assembly comprising a deflecting plate 30 positioned adjacent the prism 10 and actuated by a piezoelectric element 36. In the manner previously described, the light beam 14 passes up through the prism 10 towards the surface 13. In this embodiment the deflecting plate is substantially square or rectangular in configuration and includes parallel surfaces 31 and 32. The parallel positioned grooves 34 and 35 forming interspaces in the surface 32 of the deflecting plate divide the plate into a central section 30a and the outer parallel-positioned members 30b. A piezoelectric element 36 is cemented to the upper surfaces 32a of the members 30b. The element and plate also are cemented together at the points 37a and 37b to tie together the adjacent edges of the members 30a and 36 at the center. Additionally, parallel depressions 38 and 39 are formed in the surfaces 31 of the outer members 30b to reduce the separating forces necessary to move the transparent members apart like the groove heretofore described in the last embodiment.

Thus, by application of a bias voltage between conductor 40, the element is caused to expand and roll outward the outer sides of the members 30b thereby causing them to shift the surface 31 of the central section 30a away from the surface 13 of the prism 10. By tying the element and surface 32 together at the points 37a and 37b, the element is caused to expand symmetrically in each direction from those points relative to the plate thereby moving equal distances from the center of section 30a the side members 30b. In this embodiment also, a cement bead 41 can be placed around the outer edge of the deflecting plate and the voids between the plate and prism evacuated for the purposes heretofore explained.

Naturally, the plate can take other configurations not described, but taking full advantage of the inventive features heretofore described. For instance, center section 30a and side members 30b can be made of separate interfitted parts and the grooves and depressions can have other cross-sectional shapes for particular applications. Also the plate can be made for bistable operation whereby it will remain in either of the two positions and the actuator element need only move it but not hold it in either of these positions.

While the invention has been particularly shown and described with reference to preferred embodiments thereof, it will be evident to those skilled in the art that various changes in form and details may be made without departing from the spirit and scope of the invention.

We claim as our invention:

1. In a light deflector for controlling the position of a light beam having a first light transparent member for transmitting a light beam to be deflected and having an external surface positioned to intercept said beam at an angle of incidence exceeding the critical angle thereby to reflect it back into said member by the principle of total internal reflection along a first path, means for controlling the transmission of light from said first member by passage through said external surface, comprising:
   a second light transparent member for total internal reflection of said beam, which when in a first position has a section of one surface adjacent said first member surface at the point of interception with said beam
   said second member including grooving means making it sufficiently flexible to permit movement of the section to a second position spaced from said first member surface while the remainder of said second member remains adjacent the first member, and an actuator for moving said second member between said first and second positions wherein with the second member in the first position at least a portion of the light beam will be transmitted out of the first transparent member and when in the second position the beam will be reflected at least partially back into said first member.

2. Means for controlling the transmission of light from the first member as defined in claim 1 wherein said second member grooving means is a groove interspace in a surface thereof to enhance movement of the section thereof away from said first member, said groove located between the section and the remainder of said second member remaining adjacent the first member.

3. Means for controlling the transmission of light from the fisrt member as defined in claim 2 wherein said groove is in the surface oppoiste the surface adjacent the first member surface and said surfaces of the second member are substantially parallel.

4. Means for controlling the transmission of light from the first member as defined in claim 3 wherein a piezoelectric element is attached to said second member at positions on the grooved surface radially spaced from said section.

5. Means for controlling the transmission of light from the first member as defined in claim 4 wherein said grooved surface intercepts the beam at an angle permitting internal reflection of at least a portion thereof.

6. Means for controlling the transmission of light from the first member as defined in claim 5 wherein said piezoelectric element is spaced from the section of the second member transmitting the light beam to permit total internal reflection of the beam.

7. Means for controlling the transmission of light from the first member as defined in claim 1 wherein said actuator is a piezoelectric element.

8. Means for controlling the transmission of light from the first member as defined in claim 1 wherein said second member surface abuts said first member and includes a small depression located between said grooving means and the remainder of said second member remaining adjacent said first member thereby maintaining a portion of said surface adjacent said first member out of contact with the first member surface even when said section is moved to the first position thereby to enhance movement of the section away from the first member abutting surface.

9. Means for controlling the transmission of light from the first member as defined in claim 1 wherein said space between said first and second members is sealed from the outer atmosphere and evacuated to a lower pressure.

10. Means for controlling the transmission of light from the first member as defined in claim 1 wherein said section when moved to the second position is spaced more than two wavelengths from the first member thereby to permit the reflection of all the light beam by the first member external surface.

11. Means for controlling the transmission of light from the first member as defined in claim 1 wherein the second member is disc-shaped with a groove formed in the surface opposite that surface abutting the first member dividing the member into a center section and an outer member; and a piezoelectric element actuator is fixed to the outer member surface adjacent the groove.

12. Means for controlling the transmission of light from the first member as defined in claim 11 wherein said groove is cut along a circular path forming a circular configured center section, the surface of said center section being the contact surface for contacting said first member.

13. Means for controlling the transmission of light from the first member as defined in claim 11 wherein said second member has a rectangular configuration with the groove cut along two sides of the center section parallel to two opposing edges.

References Cited

UNITED STATES PATENTS 2,281,280  4/1942  Gabor _____ 350—161

OTHER REFERENCES

Vafiadi, Production of Short Light Flashes by Interrupted Total Internal Reflection, Optics and Spectroscopy, vol. 14, No. 5 (May 1963), pp. 377–378.

WILLIAM L. SIKES, Primary Examiner

U.S. Cl. X.R.

350—285